United States Patent
Monden

(10) Patent No.: US 10,922,525 B2
(45) Date of Patent: Feb. 16, 2021

(54) FAKE FINGER DETERMINATION APPARATUS AND FAKE FINGER DETERMINATION METHOD

(75) Inventor: Akira Monden, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 13/503,991

(22) PCT Filed: Sep. 27, 2010

(86) PCT No.: PCT/JP2010/066721
§ 371 (c)(1),
(2), (4) Date: Apr. 25, 2012

(87) PCT Pub. No.: WO2011/052323
PCT Pub. Date: May 5, 2011

(65) Prior Publication Data
US 2012/0218397 A1    Aug. 30, 2012

(30) Foreign Application Priority Data

Oct. 26, 2009 (JP) .............................. JP2009-245298

(51) Int. Cl.
*G06K 9/00* (2006.01)

(52) U.S. Cl.
CPC ....... *G06K 9/0012* (2013.01); *G06K 9/00087* (2013.01); *G06K 9/00107* (2013.01); *G06K 9/00114* (2013.01); *G06K 2009/0006* (2013.01)

(58) Field of Classification Search
CPC . G06K 2009/0006; G06K 9/0012; G06K 9/00
See application file for complete search history.

(56) References Cited

U.S. PATENT DOCUMENTS

| 5,067,162 A * | 11/1991 | Driscoll, Jr. ....... | G06K 9/00067 382/126 |
| 6,292,576 B1 * | 9/2001 | Brownlee .......... | G06K 9/00006 340/5.83 |

(Continued)

FOREIGN PATENT DOCUMENTS

| CN | 1622117 A | 6/2005 |
| EP | 1308876 A2 | 5/2003 |

(Continued)

OTHER PUBLICATIONS

Chinese Office Action dated Apr. 30, 2014 in corresponding Chinese Patent Application No. 201080048480.9.

(Continued)

*Primary Examiner* — Gelek W Topgyal
(74) *Attorney, Agent, or Firm* — Sughrue Mion, PLLC

(57) ABSTRACT

The present invention improves an accuracy to discern a fake finger created by attaching a transparent thin film to the surface of a finger. The present invention has: a mounting surface that has a mounting area to mount an authentication target that is an object of fingerprint authentication; a transparent plate that is provided on mounting surface and defines a range of an image used for determining the authenticity of the authentication target; a light source that allows light to directly enter the authentication target mounted on the mounting area, not by way of the transparent plate; and an imaging device that images the authentication target mounted on the mounting area, by way of a the transparent plate, wherein a light emitting surface for emitting light of the light source to outside is disposed on the same plane as the mounting surface.

8 Claims, 15 Drawing Sheets

(56) References Cited

U.S. PATENT DOCUMENTS

| | | | |
|---|---|---|---|
| 6,714,665 B1* | 3/2004 | Hanna | G06K 9/00 382/106 |
| 6,766,040 B1* | 7/2004 | Catalano | G06K 9/00067 340/5.53 |
| 6,885,439 B2 | 4/2005 | Fujieda | |
| 7,627,151 B2* | 12/2009 | Rowe | G06K 9/00013 340/5.53 |
| 9,141,847 B2* | 9/2015 | Shin | G06K 9/00114 |
| 2002/0118865 A1* | 8/2002 | Hosokawa | G06K 9/00013 382/124 |
| 2002/0131624 A1 | 9/2002 | Shapiro et al. | |
| 2003/0063783 A1* | 4/2003 | Higuchi | G06K 9/00046 382/125 |
| 2004/0179723 A1* | 9/2004 | Sano | G06K 9/00033 382/124 |
| 2004/0228508 A1 | 11/2004 | Shigeta | |
| 2005/0008197 A1* | 1/2005 | Dennis | G06K 9/00114 382/115 |
| 2005/0036665 A1* | 2/2005 | Higuchi | B60R 25/252 382/124 |
| 2005/0213799 A1* | 9/2005 | Sawano | G06K 9/0002 382/124 |
| 2007/0222998 A1* | 9/2007 | Sasaki | G06K 9/0004 356/445 |
| 2007/0253607 A1* | 11/2007 | Higuchi | G06K 9/00026 382/124 |
| 2007/0263906 A1* | 11/2007 | Fujii | A61B 5/0261 382/115 |
| 2007/0290124 A1* | 12/2007 | Neil | G06K 9/00013 250/221 |
| 2008/0037001 A1* | 2/2008 | Yokoyama | A61B 5/0059 356/51 |
| 2008/0225297 A1* | 9/2008 | Hossu | G06K 9/00899 356/445 |
| 2009/0087043 A1* | 4/2009 | Mizushima | G06K 9/00013 382/124 |
| 2010/0008552 A1* | 1/2010 | Shin | G06K 9/0012 382/124 |
| 2010/0045788 A1* | 2/2010 | Zhang | G06K 9/00067 348/77 |
| 2010/0098302 A1* | 4/2010 | Shin | G06K 9/0012 382/124 |
| 2012/0219194 A1* | 8/2012 | Monden | G06K 9/00107 382/124 |

FOREIGN PATENT DOCUMENTS

| | | | | |
|---|---|---|---|---|
| JP | 07-308308 A | | 11/1995 | |
| JP | 09-134419 A | | 5/1997 | |
| JP | 2637253 B2 | | 8/1997 | |
| JP | 2001-266134 | * | 9/2001 | ............... G06G 1/00 |
| JP | 2001-266134 A | | 9/2001 | |
| JP | 2003-050993 A | | 2/2003 | |
| JP | 2005-004718 A | | 1/2005 | |
| JP | 2007-279296 A | | 10/2007 | |
| JP | 2009-009403 A | | 1/2009 | |
| KR | 10-2008-0024915 A | | 3/2008 | |
| WO | 03056502 A1 | | 7/2003 | |

OTHER PUBLICATIONS

Extended European Search Report dated Mar. 1, 2017, issued by the European Patent Office in corresponding application No. 10826457.3.

* cited by examiner

FAKE FINGER DETERMINATION APPARATUS AND FAKE FINGER DETERMINATION METHOD

CROSS REFERENCE TO RELATED APPLICATIONS

This application is a National Stage of International Application No. PCT/JP2010/066721 filed on Sep. 27, 2010, which claims priority from Japanese Patent Application No. 2009-245298, filed on Oct. 26, 2009, the contents of all of which are incorporated herein by reference in their entirety.

The present invention relates to a fake finger determination apparatus and a fake finger determination method.

BACKGROUND ART

Fingerprint authentication is receiving attention lately as one authentication method to identify an individual. A fingerprint depends on the individual, and does not change over time. Therefore fingerprint authentication should have higher reliability than password authentication, which is commonly used today. On the other hand, in the case of fingerprint authentication, it is necessary to prevent the illegal act of pretending to be the actual individual by using a fake finger with a forged fingerprint of the actual individual. As a technology to prevent such illegal acts, Patent Documents 1 and 2 disclose a technology to detect a fake finger based on the color on the surface of a finger onto which light is irradiated. Patent Document 3 discloses a technology to detect a fake finger by irradiating light onto a finger from a location above the finger, and photographing a light transmitting through the finger. Patent Document 4 discloses a technology to detect a fake finger, created by attaching a thin film with a forged fingerprint to the surface of a finger, by irradiating a light onto the finger from the side, and using an obtained diffusion pattern of the light transmitted through the finger for identification.

[Patent Document 1] Patent Publication JP-A-2003-50993

[Patent Document 2] Japanese Patent Publication No. 2637253

[Patent Document 3] Patent Publication JP-A-H9-134419

[Patent Document 4] Patent Publication JP-A-2007-249296

In the case of the technology to detect a fake finger based on the color of the surface of the finger disclosed in Patent Documents 1 and 2, and the technology detect a fake finger by irradiating light onto the finger from an area above the finger disclosed in Patent Document 3, a fake finger created by attaching a transparent thin film with a forged fingerprint to a finger cannot be detected. This is because, according to Patent Documents 1 and 2, it is difficult to distinguish between the color of the surface of the fake finger on which the transparent thin film is attached and that of real skin color. In the case of Patent Document 3, the attenuation factor of the light that transmits through the transparent thin film is low, and it is difficult to distinguish the light that transmitted through the finger and the thin film from the light that transmitted only through the finger.

In the case of the technology to detect a fake finger by irradiating light onto the finger from the side disclosed in Patent Document 4, light may not be irradiated directly onto the thin film attached to the surface of the finger. In this case, the fake finger cannot be detected, just like Patent Document 3. For example, if the finger is pressed against a fingerprint sensor surface, it is possible that a part of the finger could cover an area around the thin film, and the light that is supposed to be irradiated onto the thin film could be blocked by part of the finger. In this case, the light is not irradiated directly onto the thin film, and the same state as Patent Document 3 occurs. As a result, it becomes difficult to distinguish the light that transmitted through the finger and the thin film from the light that transmitted only through the finger.

SUMMARY

With the foregoing in view, it is an object of the present invention to provide a fake finger determination apparatus and a fake finger determination method that can improve an accuracy to discern a fake finger created by attaching a transparent (the meaning of "transparent" in this description includes "translucent") thin film to the surface of the finger.

A fake finger determination apparatus of the present invention includes: a mounting surface that has a mounting area to mount an authentication target that is an object of fingerprint authentication; an imaging unit that is provided on the mounting surface and images the authentication target mounted on the mounting area by way of an image capturing area that defines a range of an image to be captured; and one or a plurality of light sources that allow light to directly enter the authentication target mounted on the mounting area not by way of the image capturing area, wherein a light emitting surface for emitting the light of the light sources to outside is disposed on the same plane as the mounting surface.

A fake finger determination method of the present invention includes steps of: mounting an authentication target that is an object of fingerprint authentication on a mounting surface that has a mounting area to mount the authentication target; allowing light from a light source to directly enter the authentication target mounted on the mounting area, not by way of an image capturing area that is provided on the mounting surface and defines a range of an image to be captured; and imaging the authentication target mounted on the mounting surface by using the imaging unit, by way of the image capturing area, wherein a light emitting surface for emitting the light of the light sources to outside is disposed on the same plane as the mounting surface.

According to the present invention, an accuracy to discern a fake finger created by attaching a transparent thin film to the surface of the finger can be improved.

DETAILED DESCRIPTION

Preferred embodiments of a fake finger determination apparatus and a fake finger determination method according to the present invention will now be described with reference to the accompanying drawings.

First Embodiment

Figure 1:
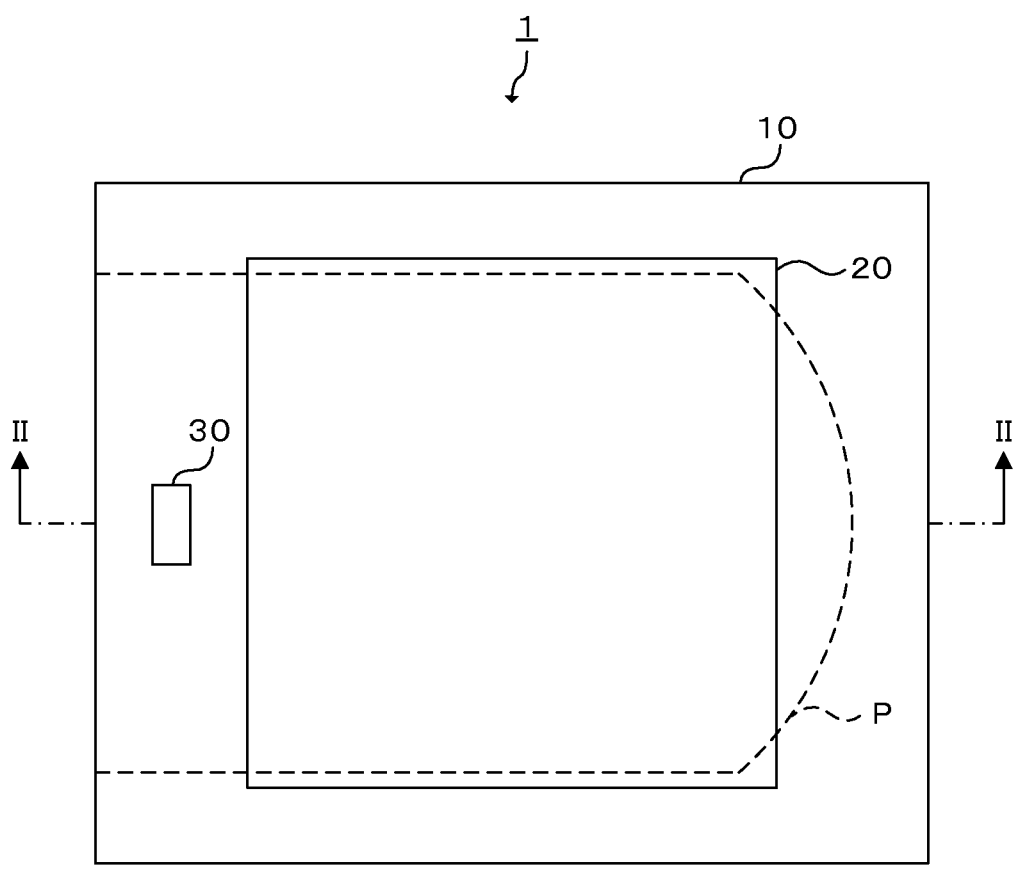
FIG. 1 is a plan view depicting a fake finger determination apparatus according to the first embodiment viewed from directly above.
Figure 2:
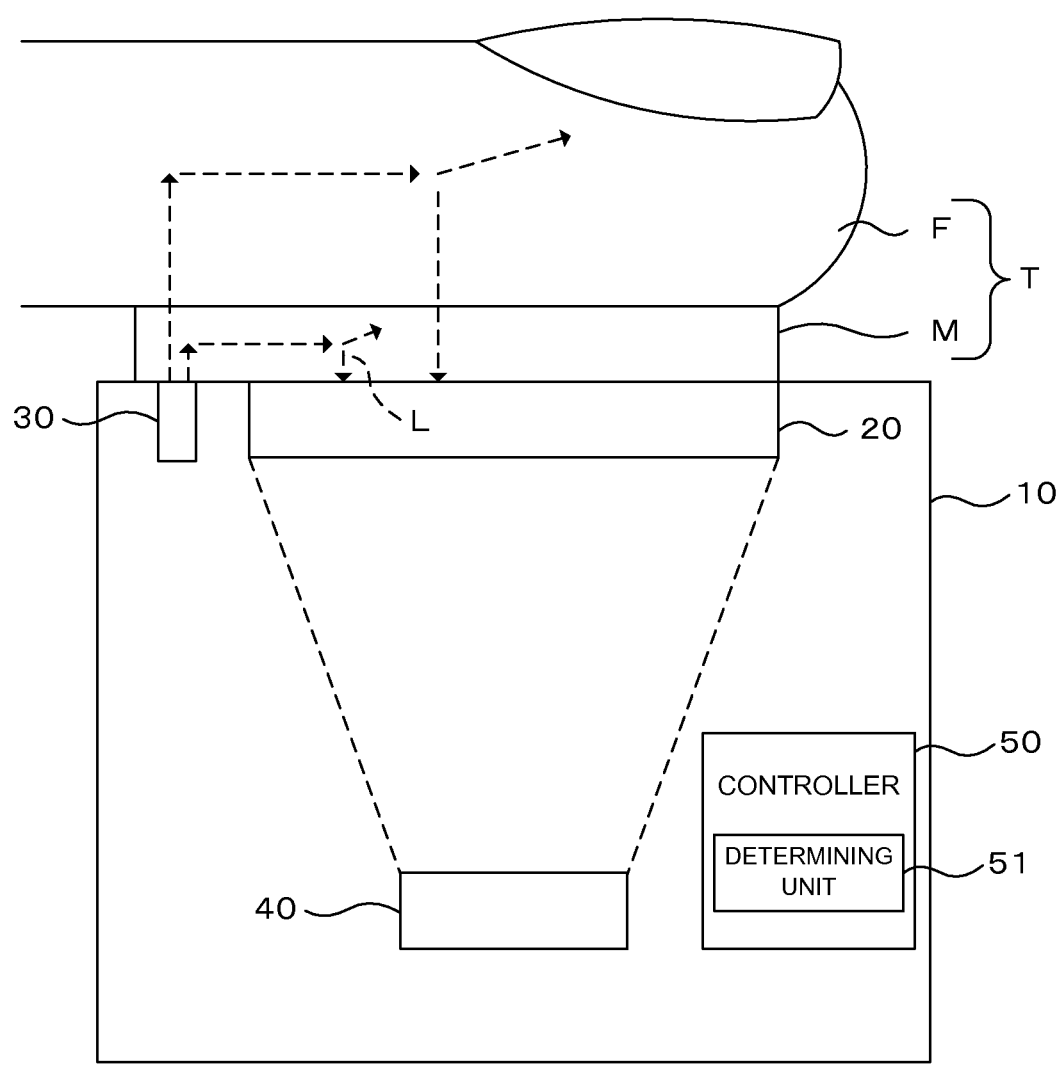
FIG. 2 is a cross-sectional view sectioned at II-II in FIG. 1.

A configuration of a fake finger apparatus according to the first embodiment will be described first with reference to FIG. 1 and FIG. 2. FIG. 1 is a plan view depicting the fake finger determination apparatus viewed from directly above. FIG. 2 is a cross-sectional view sectioned at II-II in FIG. 1.

The fake finger determination apparatus 1 is an apparatus to determine whether or not an authentication target T, to be an object of the fingerprint authentication, is a fake finger. An authentication target T, that is a finger F on which surface a thin film M is attached, is mounted on the fake finger determination apparatus 1 shown in FIG. 2. A fingerprint of someone else is copied onto this thin film M. In this case, the fake finger determination apparatus 1 determines that the authentication target T is a fake finger. If only a finger F is mounted on the fake finger determination apparatus 1 as the authentication target T, on the other hand, the fake finger determination unit 1 determines that the authentication target T is not a fake finger, but is a human finger. The configuration of the fake finger determination apparatus 1 will now be described in concrete terms.

As FIG. 1 and FIG. 2 illustrate, the fake finger determination apparatus 1 has an enclosure 10, a transparent plate 20, a light source 30, an imaging device (imaging unit) 40 and a controller 50. In the description herein below, the side where the transparent plate 20 is disposed is the upper side of the enclosure 10. The surface of the enclosure 10 where the transparent plate 20 is disposed, that is the top face of the enclosure 10, is the mounting surface to mount the authentication target T.

Each composing element of the fake finger determination apparatus 1, that is the enclosure 10, the transparent plate 20, the light source 30, the imaging device 40 and the controller 50, is basically the same as an enclosure, a transparent plate, a light source, an imaging device and a controller of a conventional fingerprint authentication apparatus. A difference from a conventional fingerprint authentication apparatus, however, is in the arrangement of the light source 30 (including the light emitting surface) and the controller 50 that has a function to determine the authenticity of the authentication target.

The transparent plate 20 and the light source 30 are disposed so that the respective top faces are located on the same plane as the mounting surface. A mounting area P, to mount the authentication target T, is created on the top faces of the transparent plate 20 and the light source 30.

The imaging device 40 is disposed below the transparent plate 20. The image device 40 captures an image from inside the enclosure 10 in the direction of the transparent plate 20. In other words, the imaging device 40 images the authentication target T mounted on the mounting area P by way of the transparent plate 20.

Out of an image captured by the imaging device 40, the portion inside the frame of the transparent plate 20 is an image used for determining the authenticity of the authentication target T mounted on the mounting area P. In other words, the transparent plate 20 defines the determination target area (image capturing area) to determine whether the authentication target T is a fake finger.

The light source 30 is disposed so that the top face (light emitting surface) thereof is located on the same plane as the mounting surface. Thereby the light can be irradiated onto the authentication target T, mounted on the mounting area P, from the bottom of the authentication target. If a thin film M is attached to the surface of a human finger F, the probability that the light will directly enter the thin film M can be increased because of this arrangement. According to this embodiment, the light emitting surface to emit the light of the light source to outside the fake finger determination apparatus is created by the top face of the light source 30.

It is preferable that the light emitting surface of the light source 30 is disposed in a position adjacent to the transparent plate 20. Because as the light emitting surface of the light source 30 becomes closer to the transparent plate 20, the probability that the light will directly enter the thin film M attached to the surface of the human finger F can be increased. The reflected light from the authentication target T however must not be included in the transmitted light image. If the reflected light from the authentication target T is included in the transmitted light image, the brightness value of the transmitted light image increases, and the later mentioned accuracy, to determine a fake finger by the determining unit 51, drops. To prevent inclusion of the reflected light from the authentication target T in the transmitted light image, the light source 30 should be disposed as follows.

The light source 30 is disposed so that the light emitting surface thereof is located in the position where the light can directly enter the authentication target T mounted on the mounting area P, not by way of the transparent plate 20 which is a determination target area. Thereby the imaging device 40 can capture a transmitted light image which includes the light transmitted through the authentication target T mounted on the mounting area P, and does not include the light reflected on the surface of the authentication target T.

The controller 50 controls the entire fake finger determination apparatus 1 by executing various control processings. The controller 50 has a determining unit 51, for example.

The determining unit 51 determines the authenticity of the authentication target T using the brightness value of the image captured by the imaging device 40. In concrete terms, the determining unit 51 determines the authenticity of the authentication target depending on whether the brightness value of a predetermined pixel, included in the transmitted light image captured by the imaging device 40, is within a predetermined range.

For the predetermined pixel, a pixel located in a position somewhat distant from the light source 30 can be set, for example. This is because the light irradiated from the light source 30 onto a finger gradually attenuates inside the finger, and if a pixel close to the light source 30 is set for the predetermined pixel, attenuation of the light is so little that it is difficult to determine the authenticity of the authentication target T. At least one pixel can be set as the predetermined pixel, but it is preferable to set a plurality of pixels with a predetermined interval from a location close to the light source 30 to a location distant from the light source 30. If a plurality of pixels are set, brightness values according to the attenuation state of the light inside the finger can be obtained if the authentication target T is a human finger, and determination accuracy can be further improved.

For the predetermined range, a range of brightness values which a human finger imaged as the authentication target T could have, for example, can be used. Here it is known that the light transmittance (attenuation factor) in the human skin is confined to within a specific range depending on the wavelength of the light. If light is irradiated onto the surface of the skin and the light that transmits through the skin is imaged, the brightness value of the transmitted light image tends to become smaller as the distance from the light source increases. The brightness value of the transmitted light image of a human finger will now be described with reference to FIG. 3 and FIG. 4.

Figure 3A:
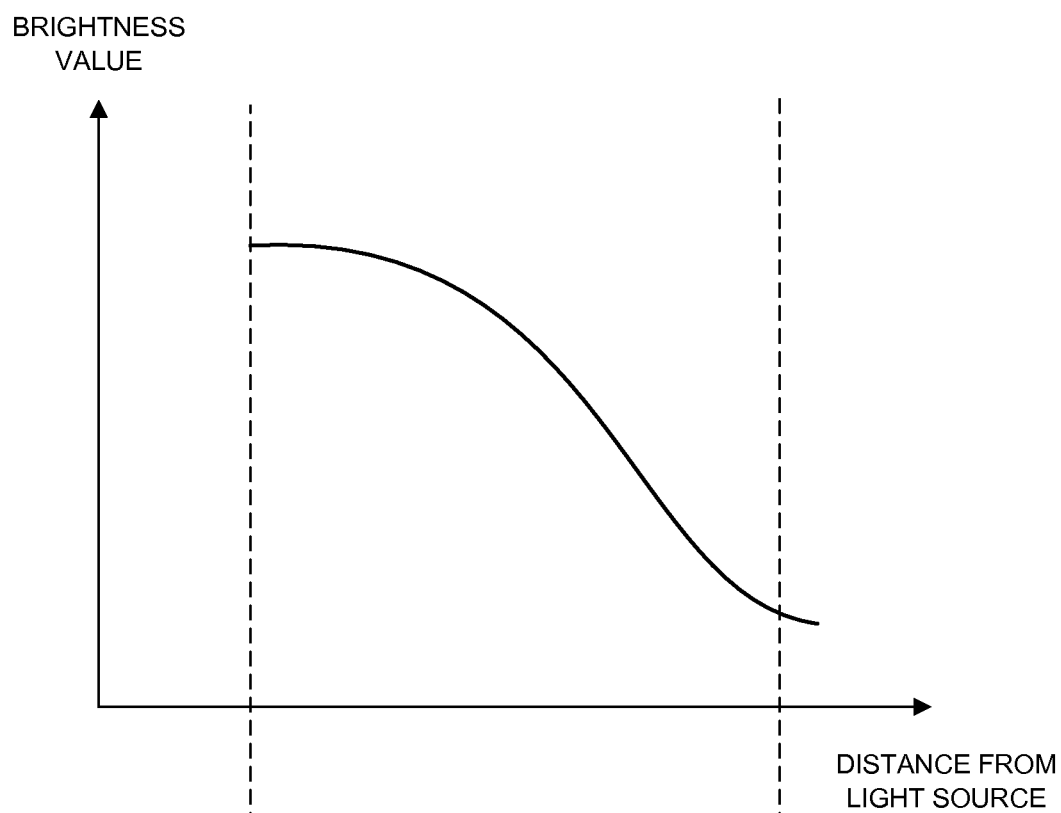
FIG. 3A is a graph depicting a relationship between the distance from the light source and the brightness value of the transmitted light image of a human finger.
Figure 3B:
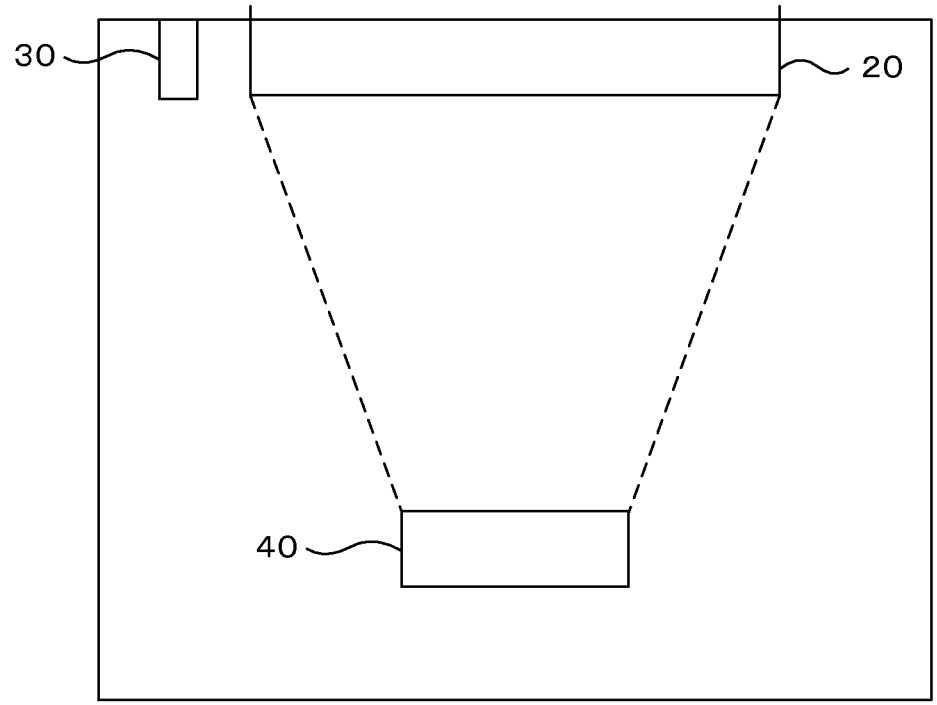
FIG. 3B is a schematic diagram of the distance from the light source according to the abscissa of the graph in FIG. 3A.

The brightness value of the transmitted light image in the case of imaging a human finger as the authentication target will be described with reference to FIG. 3. FIG. 3A is a graph depicting a relationship between the distance from the light source and the brightness value of the transmitted light image of a human finger. The abscissa of FIG. 3A indicates a distance from the light source, and the ordinate indicates a brightness value of the transmitted light image. FIG. 3B is a schematic diagram depicting the distance from the light source according to the abscissa of the graph in FIG. 3A. As FIG. 3A and FIG. 3B show, the brightness value of the transmitted light image increases as the distance from the light source 30 decreases, and the brightness value of the transmitted light image decreases as the distance from the light source 30 increases. This is because the light irradiated onto the surface of the finger gradually attenuates inside the finger.

Figure 4:
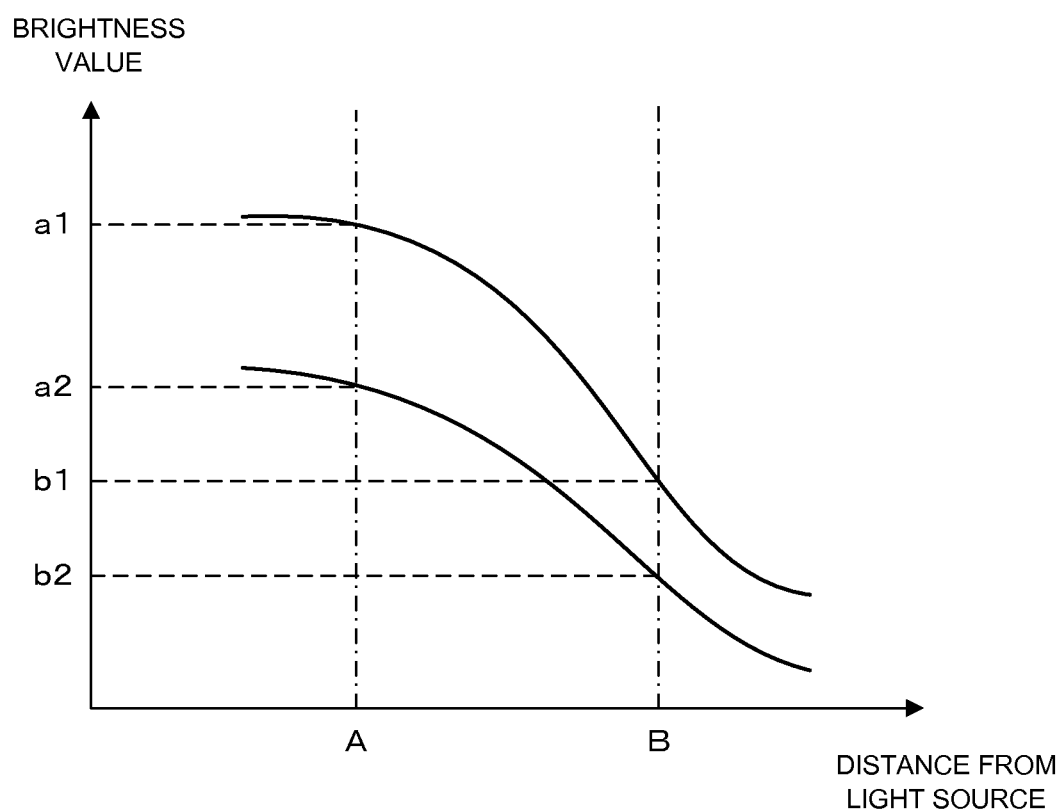
FIG. 4 is a graph depicting the upper limit and the lower limit of the brightness value of the transmitted light image shown in FIG. 3A.

FIG. 4 is a graph depicting the upper limit and the lower limit of the brightness value of the transmitted light image shown in FIG. 3A. In other words, FIG. 4 is a graph depicting a range of brightness values which a human finger, imaged as the authentication target, could have. In this case, the determining unit 51 determines that the authentication target is a human finger if the brightness value of a pixel located at point A of the transmitted light image is in the range of "a2" to "a1", and the brightness value of a pixel located at point B of the transmitted light image is in the range of "b2" to "b1".

A number of pixels used for determination (hereafter called "pixels for determination") can be freely set. If a plurality of pixels for determination is set, the determining unit 51 can determine that the authentication target is a human finger when the brightness values of all the pixels for determination are within a predetermined range. It may be determined that the authentication target is a human finger when a number of pixels for determination, having a brightness value which is within a predetermined range, is a predetermined value or more.

A brightness value of a transmitted light image when a fake finger created by attaching a thin film to the surface of a human finger is imaged, on the other hand, is outside the predetermined range. The brightness value of the transmitted light image of a fake finger created by attaching a thin film to the surface of a human finger will be described with reference to FIG. 5 and FIG. 6.

Figure 5:
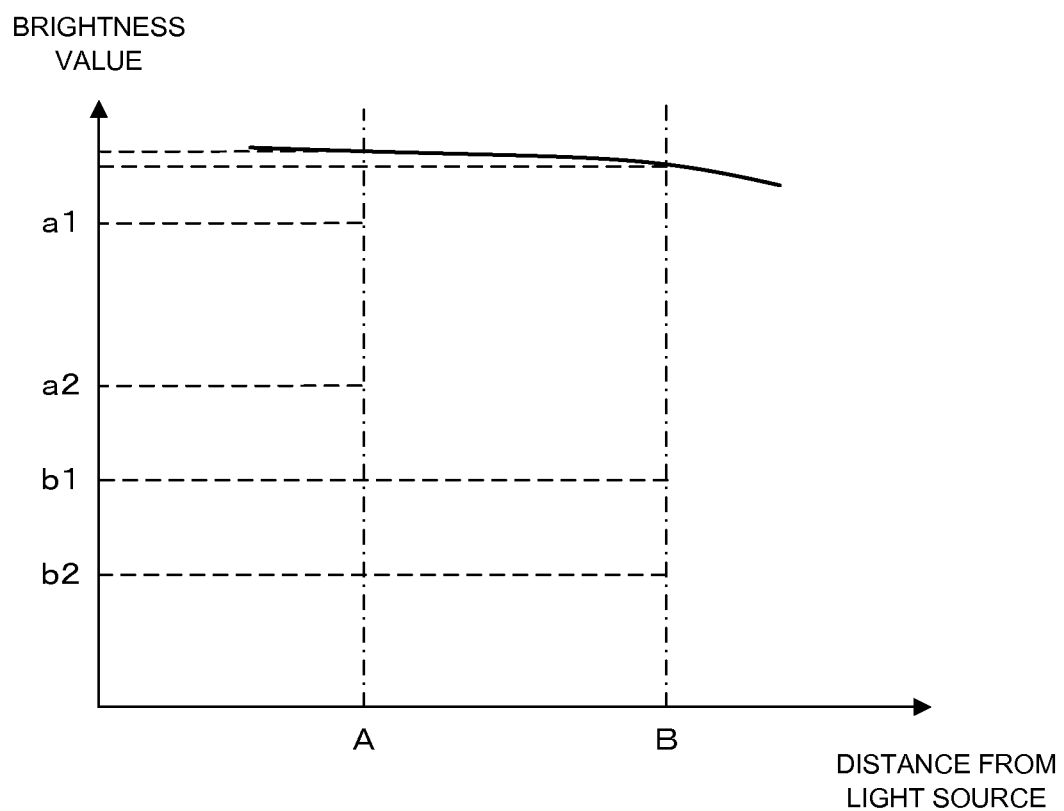
FIG. 5 is a graph depicting a relationship between the distance from the light source and the brightness value of the transmitted light image in the case of imaging a fake finger created by attaching a transparent film to the surface of the finger.

FIG. 5 is a graphic depicting a relationship between the distance from the light source and the brightness value of the transmitted light image in the case of imaging a fake finger created by attaching a transparent film to the surface of the finger. As FIG. 5 shows, the brightness value of the pixel located at point A is higher than "a1", and the brightness value of the pixel located at point B is higher than "b1". This is because an image of the light transmitted only through the transparent film (see the dotted arrow L in FIG. 2) is included in the transmitted light image. The transmittance of the transparent film is higher than the transmittance of the human finger, therefore the transmitted light image of the transparent film becomes brighter than the transmitted light image of the human finger.

Figure 6:
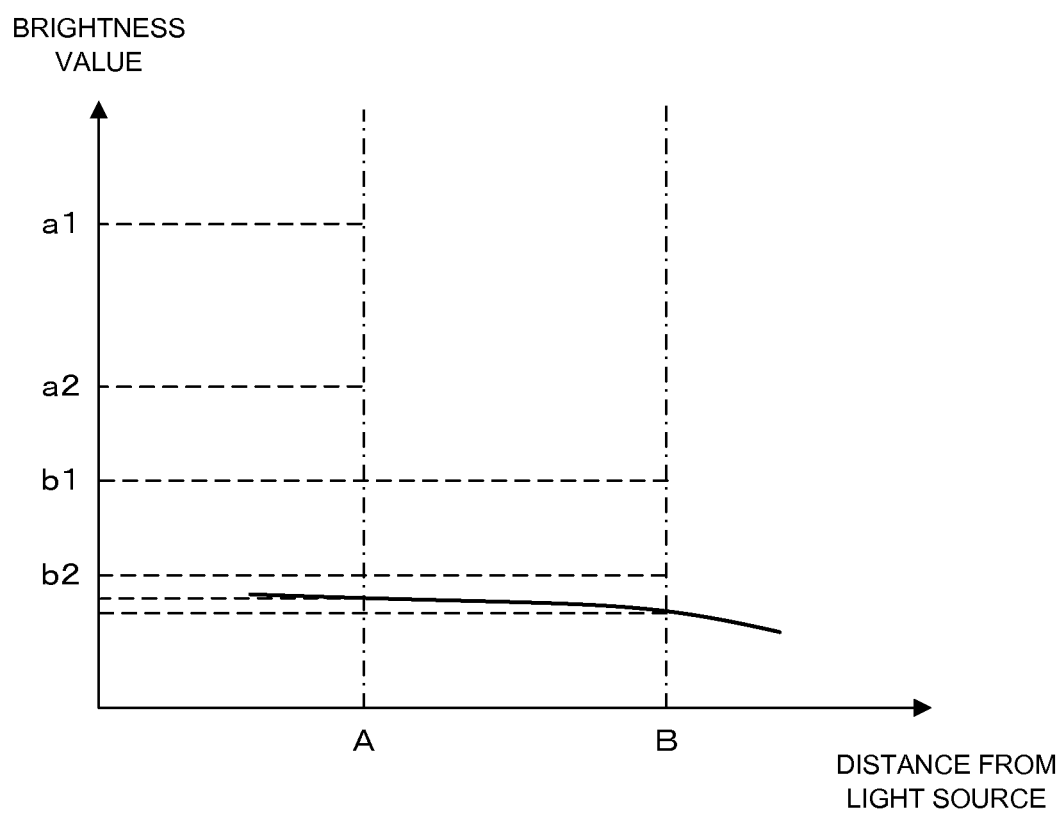
FIG. 6 is a graph depicting a relationship between the distance from the light source and the brightness value of the transmitted light image in the case of imaging a fake finger created by attaching an opaque film to the surface of the finger.

FIG. 6 is a graph depicting a relationship between the distance from the light source and the brightness value of the transmitted light image in the case of imaging a fake finger created by attaching an opaque film to the surface of the finger. As FIG. 6 shows, the brightness value of the pixel located at point A is lower than "a2", and the brightness value of the pixel located at point B is lower than "b2". This is because an image of the light transmitted through the opaque film is included in the transmitted light image. The transmittance of the opaque film is lower than the transmittance of the human finger, therefore the transmitted light image of the opaque film becomes darker than the transmitted light image of the human finger.

As described above, according to the fake finger determination apparatus 1 of the first embodiment, the authenticity of the authentication target can be determined depending on whether a brightness value of a predetermined pixel included in the transmitted light image captured by the imaging device 40 is within a range of brightness values, which a human finger imaged as the authentication target T, could have.

According to the fake finger determination apparatus 1 of the first embodiment, the light source 30 can be disposed so that the top face thereof is located on the same plane as the mounting surface, and can be disposed in a location so that the light can directly enter the authentication target T, not by way of the transparent plate 20. Thereby light can be irradiated onto the authentication target T mounted on the mounting area P, from the bottom of the authentication target T. If the human finger on which surface a thin film is attached is mounted on the mounting area P, a probability that the top face of the light source 30, which is located on the same plane as the mounting surface, will contact the thin film increases, and as a result, a probability that the light will directly enter the thin film can be increased. Hence the accuracy to discern a fake finger created by attaching a thin film to a surface of a human finger can be improved.

Furthermore the light source 30 is disposed adjacent to the transparent plate 20, thereby a probability that the light will directly enter the thin film attached to the surface of the human finger can be further increased.

Figure 7:
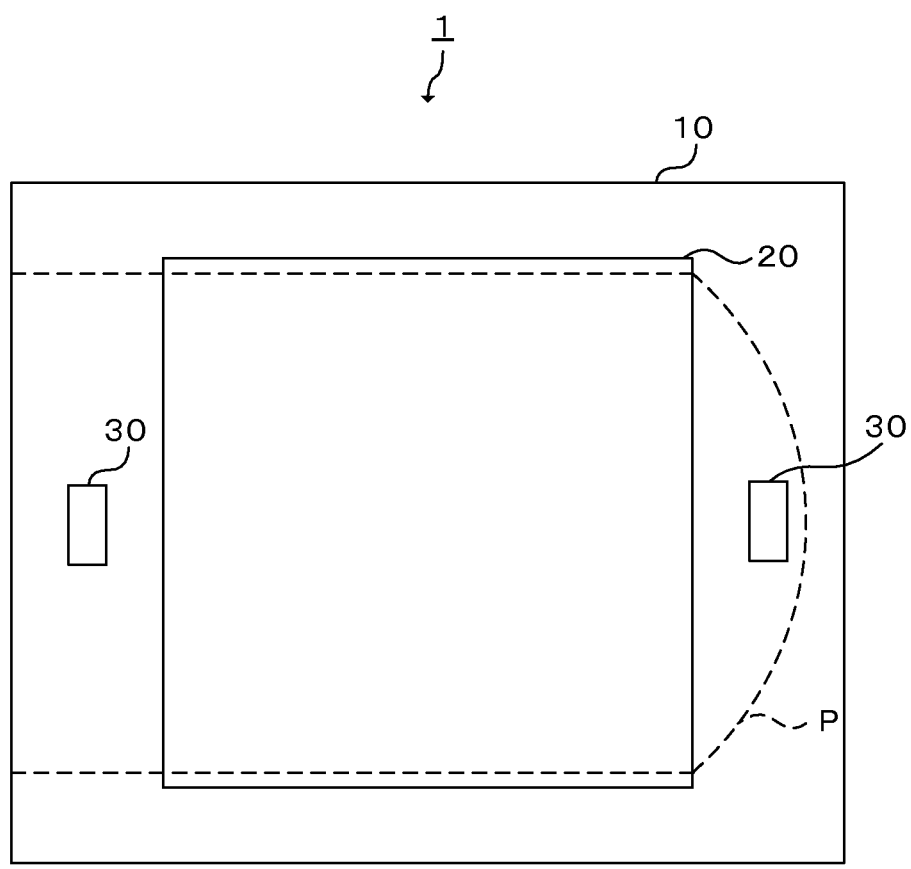
FIG. 7 is a diagram depicting an arrangement of the light sources according to a variant form.
Figure 8:
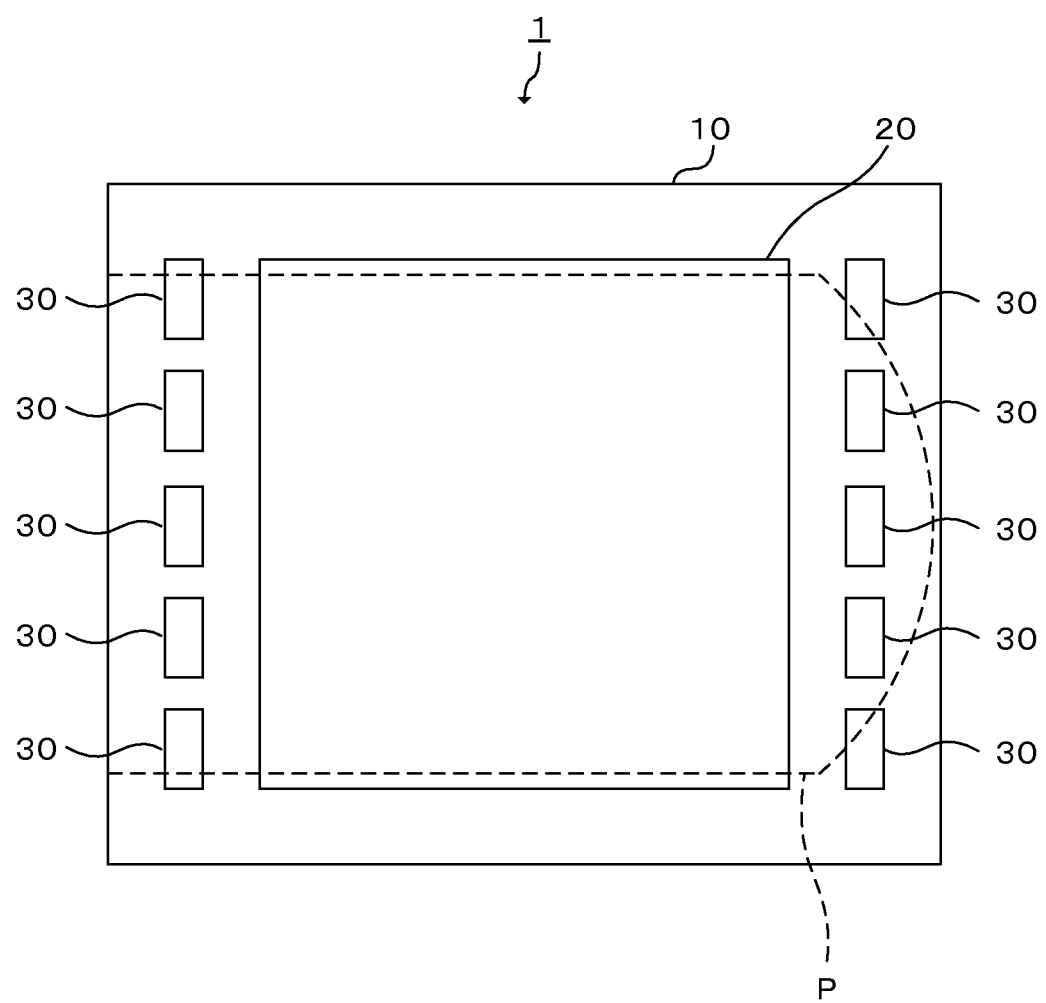
FIG. 8 is a diagram depicting an arrangement of the light sources according to a variant form.

According to the above described first embodiment, one light source 30 is disposed on one side of the transparent plate 20 (a determination target area), but the arrangement of the light source is not limited to this. For example, one light source 30 may be disposed on both sides of the transparent plate 20 (determination target area) respectively, as shown in FIG. 7. Or a plurality of light sources 30 may be disposed on both sides of the transparent plate 20 (determination target area) respectively, as shown in FIG. 8. In this case, the quantity of light that transmits through the skin can be increased by arranging the light sources 30 so as to cover the determination target area.

According to the above described first embodiment, the authenticity of the authentication target is determined using a brightness value of a predetermined pixel included in the transmitted light image captured by the imaging device 40, but the means of obtaining the brightness of the predetermined pixel is not limited to the imaging device 40. For example, instead of the imaging device 40, an illuminance sensor (imaging unit) for detecting brightness of a predetermined pixel may be disposed for each predetermined pixel, and the authenticity of the authentication target may be determined using the brightness of the predetermined pixel detected by this illuminance sensor.

For the wavelength of the light source 30, a wavelength in the 700 nm to 1200 nm range, which is called the "therapeutic window", may be used. If a wavelength in the 700 nm to 1200 nm range is used, the quantity of light that transmits through the skin can be increased, therefore while determining the authenticity of the authentication target as mentioned above, a skin pattern to be used for fingerprint authentication can be obtained at the same time. In the case of obtaining a skin pattern at the same time, it is preferable that the light sources 30 are arranged as illustrated in FIG. 8, for example. By arranging the light sources so as to cover the entire determination target area, more light can transmit through the finger, and accuracy to obtain the skin pattern can be improved.

The above mentioned light source 30 of the first embodiment is disposed, so that the top face thereof is located on the same plane as the mounting surface, but the position of the light source 30 is not limited to this. It is required to dispose the light source 30 in a position so that light can be irradiated onto the authentication target T mounted on the mounting area P from the bottom of the authentication target T. As a concrete example, the light source 30 is disposed in a location below the mounting area P, and the light emitting surface, to emit the light of the light source to outside the fake finger determination apparatus, is separately disposed so as to be located on the same plane as the mounting surface. The light emitting surface in this case can be disposed as follows. For example, the light source 30 is surrounded by a shielding wall to create an optical path, this optical path is extended, and the end face of this optical path becomes a light emitting surface.

Second Embodiment

A second embodiment of the present invention will now be described. According to the fake finger determination apparatus of the second embodiment, the authenticity of the authentication target is determined based on the degree of attenuation of the light, which is calculated using the brightness value of the transmitted light image, and this aspect is different from the fake finger determination apparatus of the first embodiment, which determines the authenticity of the authentication target depending on the brightness value of the transmitted light image.

The difference of the fake finger determination apparatus of the second embodiment from the above mentioned fake finger determination apparatus of the first embodiment lies in the function of the determining unit 51 of the controller 50. The other configuration is the same as that of the fake finger determination apparatus of the first embodiment, therefore each composing element is denoted with the same reference symbol for which description is omitted. In this section, the difference from the first embodiment will be mainly described.

The determining unit 51 calculates an attenuation factor to indicate a degree of attenuation of the light, using the brightness values of a plurality of predetermined pixels included in the transmitted light image captured by the imaging device 40, and determines the authenticity of the authentication target T depending on whether the attenuation factor is within a predetermined range.

For the plurality of predetermined pixels, pixels can be set at a predetermined interval, from a location close to the light source 30 to a position distant from the light source 30, for example. A number of the predetermined pixels can be set to an efficient value considering the calculation according to the attenuation factor and the calculation time of the attenuation factor.

For the predetermined range, a range of the attenuation factors which a human finger, imaged as the authentication target, could have, can be used.

Figure 9:
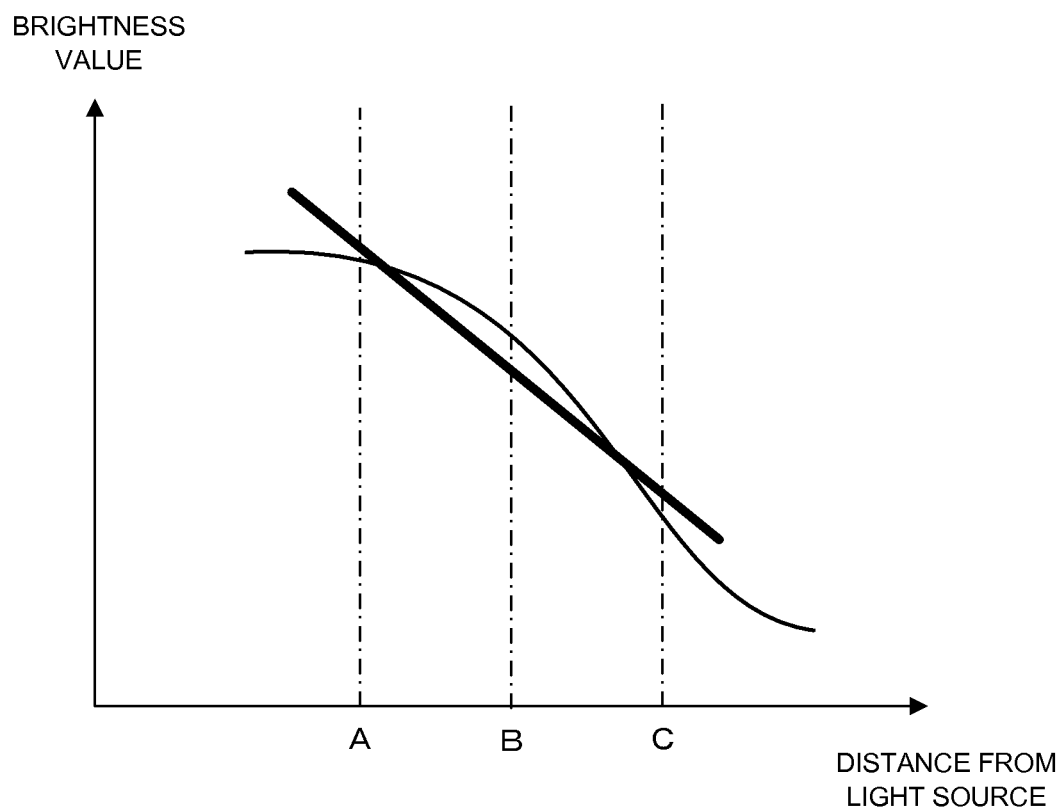
FIG. 9 is a graph depicting a method for calculating an attenuation factor according to the second embodiment.

The determining unit 51 can calculate the attenuation factor as follows. For example, the determination unit 51 obtains the brightness values at point A, point B and point C shown in FIG. 9 respectively, determines the inclination of the brightness values of these three points, and calculates this inclination as the attenuation factor. For the method for determining the inclination, the least square method, for example, can be used. In this case, the determining unit 51 determines the inclination of the brightness values by determining the inclination of the line which minimizes least square errors.

The determining unit 51 may determine a coefficient a of the following Expression 1, and calculate the coefficient a as the attenuation factor. Here x of Expression 1 is a distance from the light source, f(x) is a function to indicate a brightness value of a pixel of which distance from the light source is x, and a is an attenuation factor.

$$f(x) = \exp(-ax) \qquad \text{Expression 1}$$

By determining the authenticity of the authentication object T using the attenuation factor, an imaging device with an automatic sensitivity control function can be used for the imaging device 40. If the automatic sensitivity control function is included, however, the brightness value of the image is corrected according to the sensitivity, and the brightness value changes from the original value. Therefore this function cannot be used for the fake finger determination apparatus 1 of the first embodiment, which determines the authenticity of the authentication target within the range of the brightness values.

Whereas in the fake finger determination apparatus 1 of the second embodiment, the authenticity of the authentication target is determined using an attenuation factor which is not changed by the automatic sensitivity control function. Therefore even if the brightness values are corrected by the automatic sensitivity control function, the authenticity determination result of the authentication target is not affected. Therefore the fake finger determination apparatus 1 of the second embodiment can not only have the above mentioned effects of the first embodiment, but can also be applied to an imaging device having the automatic sensitivity control function.

Third Embodiment

According to the above mentioned fake finger determination apparatus 1 of the first embodiment, the light source 30 is disposed outside the determination target area, which is defined by the transparent plate 20 (see FIG. 1 and FIG. 2). In this case, if the size of the thin film M with a forged fingerprint is set to the size of the transparent plate 20 (determination target area), and the authentication target T is mounted and imaged in such a way that the thin film M is matched with the frame of the transparent plate 20, then the light of the light source 30 does not enter the thin film M, and enters only the human finger F. In this case, it becomes difficult to distinguish this brightness value of the transmitted light image from the brightness value of the transmitted light image generated when only the human finger F is imaged, and illegal acts can no longer be prevented.

According to the fake finger determination apparatus of the third embodiment, the light source 30 is disposed in a position surrounded by the determination target area, and the authentication target T is imaged a plurality of times while shifting the mounting position of the authentication target T each time. Thereby it becomes possible to allow the light source 30 to enter the thin film M at least once during imaging, and illegal acts using thin film M matching with the size of the determination target area can be prevented.

The difference of the configuration of the fake finger determination apparatus of the third embodiment from the above mentioned fake finger determination apparatus of the first embodiment is that the transparent plate is divided into two, and the light source is disposed between the transparent plates, and a combining unit 52 is added to the controller 50. The other configuration is the same as that of the fake finger determination apparatus of the first embodiment, therefore each composing element is denoted with the same reference symbol for which description is omitted. In this section, the difference from the first embodiment will be mainly described.

Figure 10:
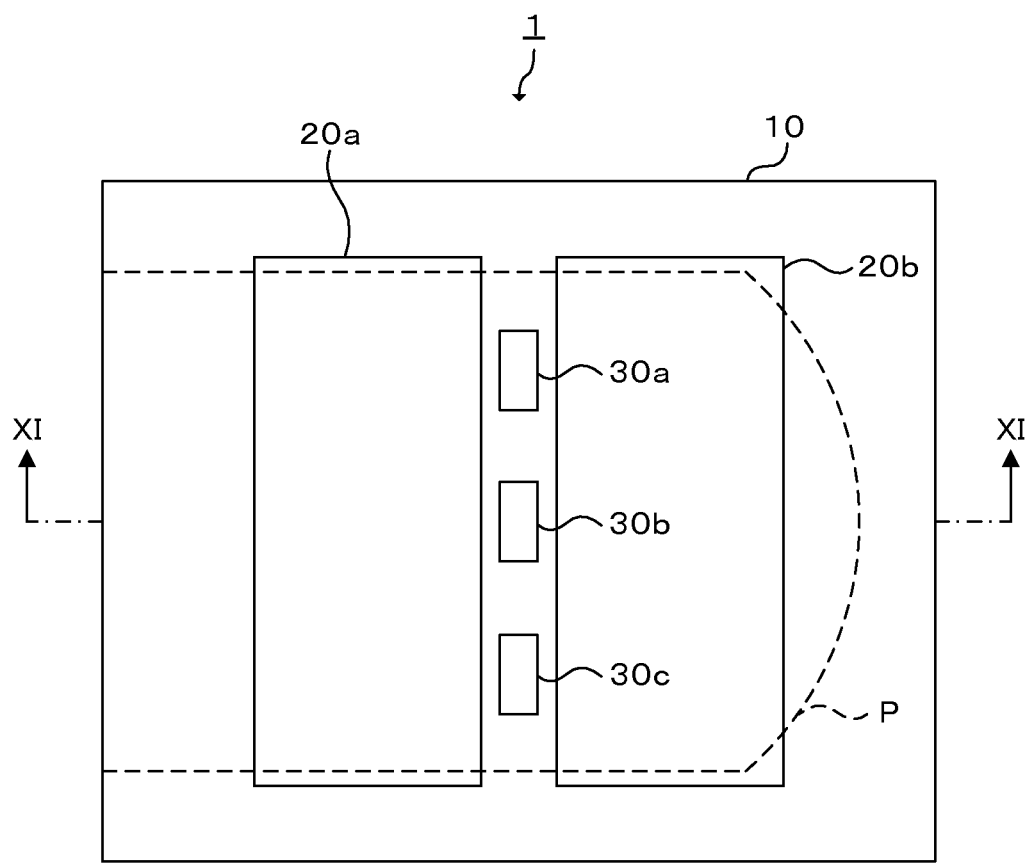
FIG. 10 is a plan view depicting a fake finger determination apparatus according to the third embodiment viewed from directly above.
Figure 11:
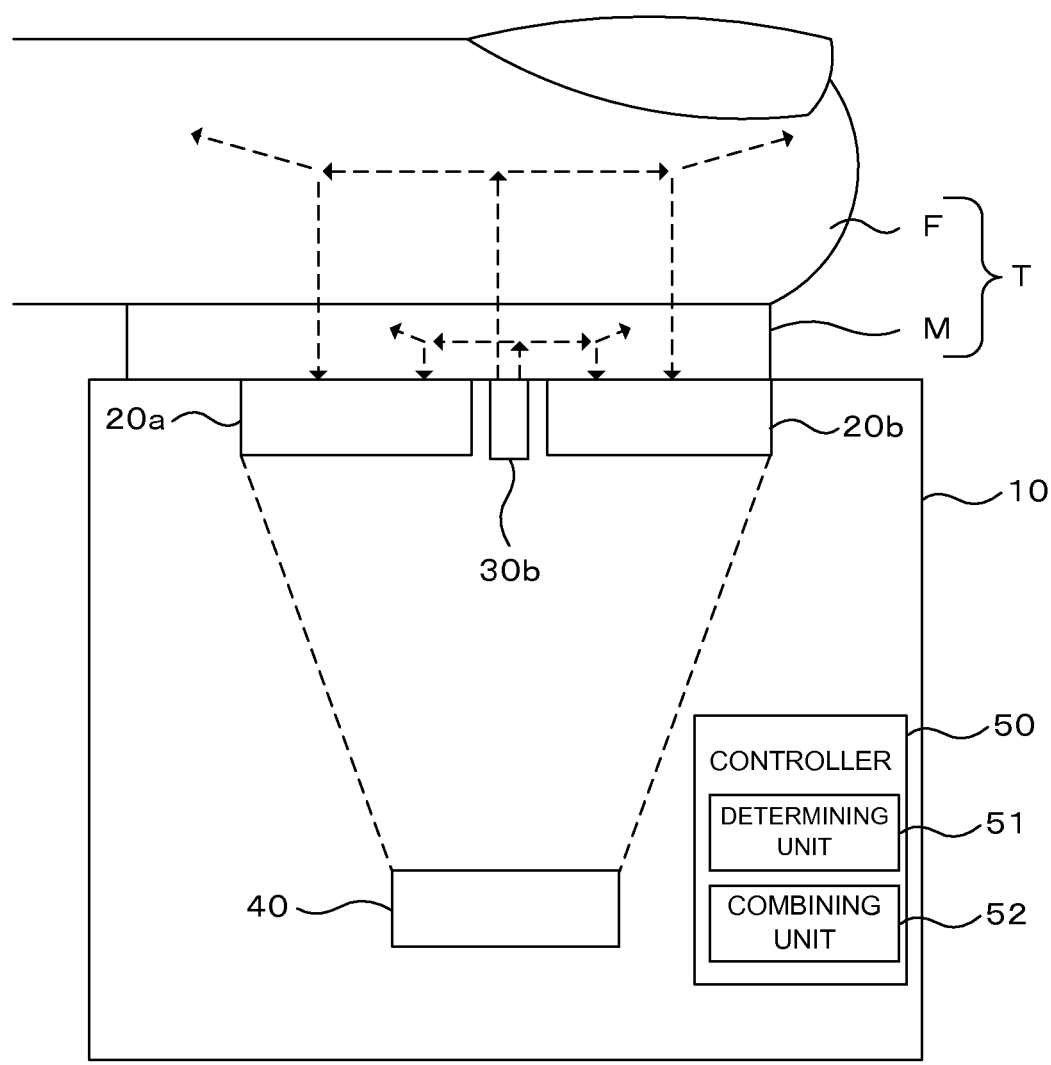
FIG. 11 is a cross-sectional view sectioned at XI-XI in FIG. 10.

The configuration of the fake finger determination apparatus according to the third embodiment will now be described with reference to FIG. 10 and FIG. 11. FIG. 10 is a plan view depicting the fake finger determination apparatus viewed from directly above. FIG. 11 is a cross-sectional view sectioned at XI-XI in FIG. 10.

The fake finger determination apparatus 1 has two transparent plates 20a and 20b, and three light sources 30a, 30b and 30c. The light sources 30a, 30b and 30c are disposed between the transparent plates 20a and 20b. In other words, the light sources 30a, 30b and 30c are interposed in the determination target area which is formed connecting the two transparent plates 20a and 20b. A number of transparent plates and a number of light sources can be freely set.

The transparent plates 20a and 20b and the light sources 30a, 30b and 30c are disposed so that the top faces thereof are located on the same plane as the mounting surface. A mounting area P, to mount the authentication target T, is created on the top faces of the transparent plates 20a and 20b and the light sources 30a, 30b and 30c.

Figure 12:
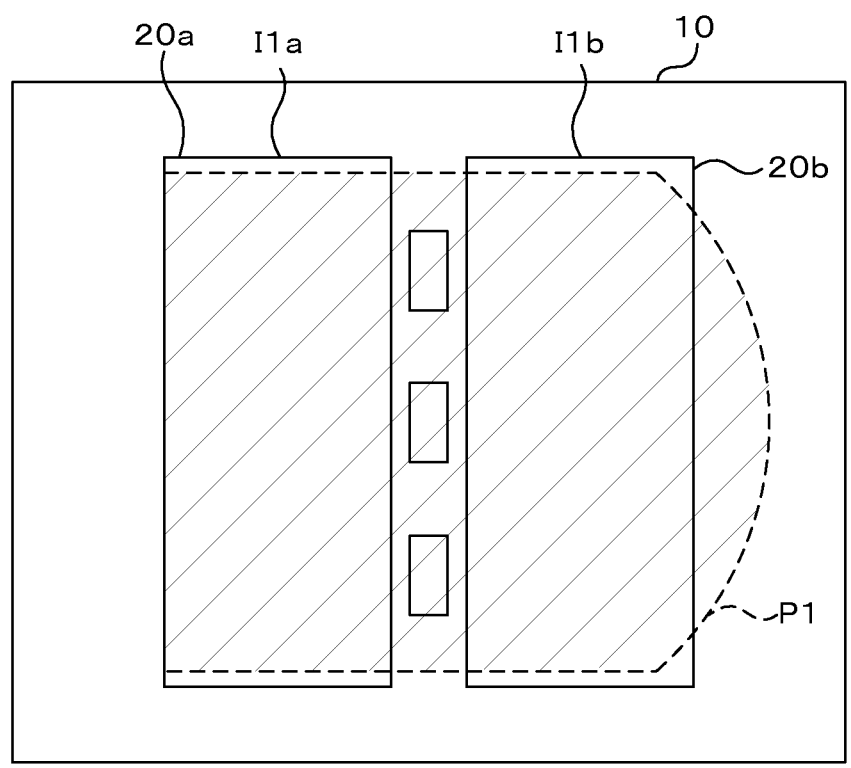
FIG. 12 is a diagram depicting a first mounting area.
Figure 13:
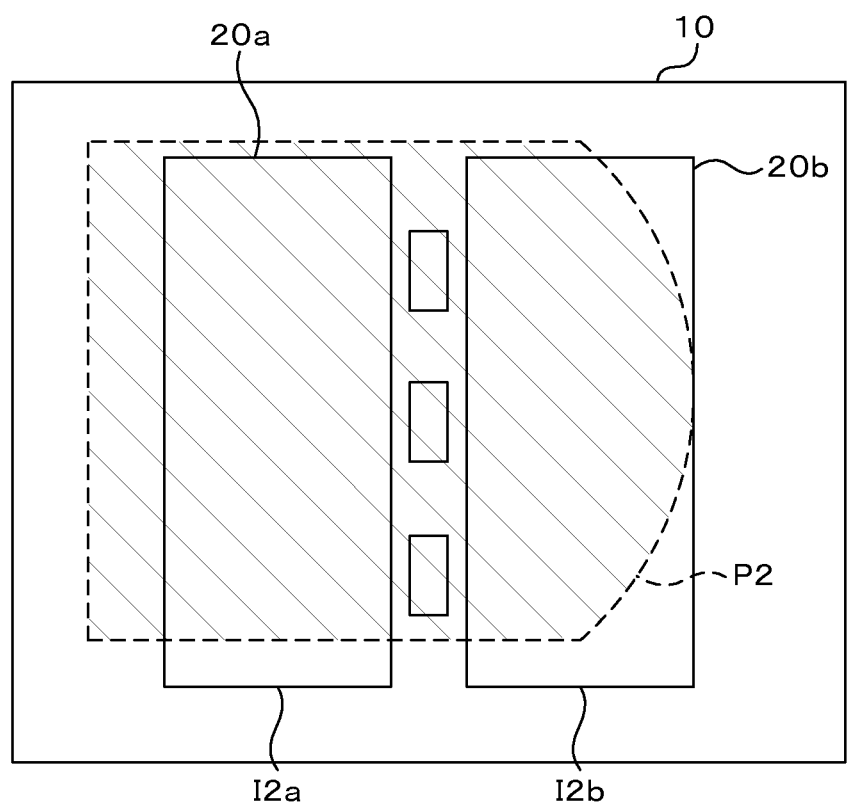
FIG. 13 is a diagram depicting a second mounting area.

According to the fake finger determination apparatus 1 of the third embodiment, the mounting area P is created on two different locations on the mounting surface. One is a first mounting area P1 illustrated in FIG. 12, and the other is a second mounting area P2 illustrated in FIG. 13. A number of locations to create a mounting area is not limited to two, but a mounting area can be created at arbitrary locations.

It is preferable that the positional shift between the first mounting area P1 and the second mounting area P2 is set so as to match with the distance between the transparent plates 20a and 20b. Then when the images are combined as described later, an area which cannot be imaged between the transparent plates 20a and 20b can be interpolated by two images, and a combined image without any lost data can be generated.

The imaging device 40 captures images from inside the enclosure 10 in the directions toward the transparent plates 20a and 20b. In other words, the imaging device 40 images the authentication target T mounted on the first mounting area P1 and the second mounting area P2 by way of the transparent plates 20a and 20b. Out of the transmitted light images captured by the imaging device 40, the portions in the respective frames of the transparent plates 20a and 20b are images used for determining the authenticity of the authentication target T disposed on the first mounting area P1 and the second mounting area P2. In other words, the transparent plates 20a and 20b define the determination target area to determine whether the authentication target T is a fake finger.

It is preferable to set the imaging interval of the imaging device 40 to a time at least sufficient to change the mounting position of the authentication target T and a time that makes it difficult to replace the thin film M.

Figure 14:
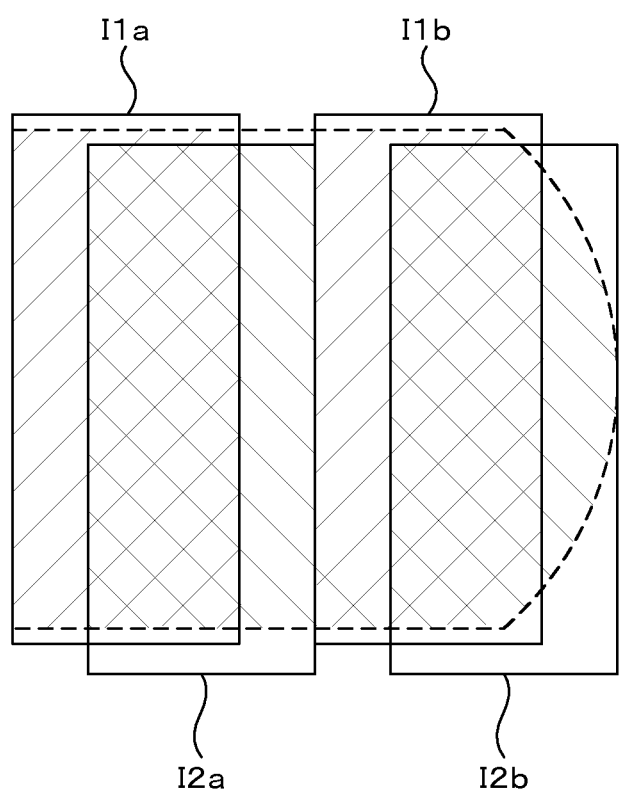
FIG. 14 is a diagram depicting a method for combining a plurality of transmitted light images.

The combining unit 52 combines a plurality of transmitted light images captured by the imaging device 40. This will be described in concrete terms with reference to FIG. 14. The combining unit 52 compares the pattern of the transmitted light images 11a and 11b of the authentication target T mounted on the first mounting area P1 and the pattern of the transmitted light images 12a and 12b of the authentication target T mounted on the second mounting area P2, for example, and superposes similar characteristic points with each other so as to combine the transmitted light images 11a and 11b and the transmitted light images 12a and 12b. Thereby the combined image of the authentication target T can be generated.

If the similarity between the patterns is lower than a predetermined threshold, the combining unit 52 outputs an input error, and prompts for re-input of the authentication target T. If illegal acts of replacing a thin film M to match the transparent plate are performed each time the mounting position of the authentication target T is changed and imaged, similarity between the patterns becomes low, therefore the authentication target T can be rejected as an input error.

The determining unit 51 determines the authenticity of the authentication target using the brightness value of the image combined by the combining unit 52. For the method of determining the authenticity of the authentication target, various methods described in the first embodiment and the second embodiment can be used.

For example, the determining unit 51 can determine the authenticity of the authentication target depending on whether the brightness value of the predetermined pixel included in the combining image combined by the combining unit 52 is within a predetermined range.

The determining unit 51 can also determine the authenticity of the authentication target by calculating the attenuation factor to indicate a degree of authentication of light using the brightness values of a plurality of predetermined pixels included in the combined image combined by the combining unit 52, and determining whether this attenuation factor is within a predetermined range.

As described above, according to the fake finger determination apparatus 1 of the third embodiment, the light sources 30 are disposed in the determination target area, and the authentication target T can be imaged a plurality of times while shifting the mounting position thereof. Therefore even if a fake finger on which a thin film M, matching the size of the determination target area, is attached is used, the light of the light sources 30 can enter the thin film M with certainty. As a result, illegal acts using a thin film M matching the size of the determination target area can be prevented.

Each embodiment mentioned above is merely an example, and does not negate various modifications and the use of technologies not explicitly stated in an embodiment. In other words, the present invention can be modified in various forms within the scope not departing from the true spirit of the invention.

For example, in each embodiment mentioned above, the determination target area is defined by a transparent plate, but the means of defining the determination target area is not limited to a transparent plate. Any other means can be used as long as the means can define an image to be used for determining the authenticity of the authentication target mounted on the mounting area.

Figure 15:
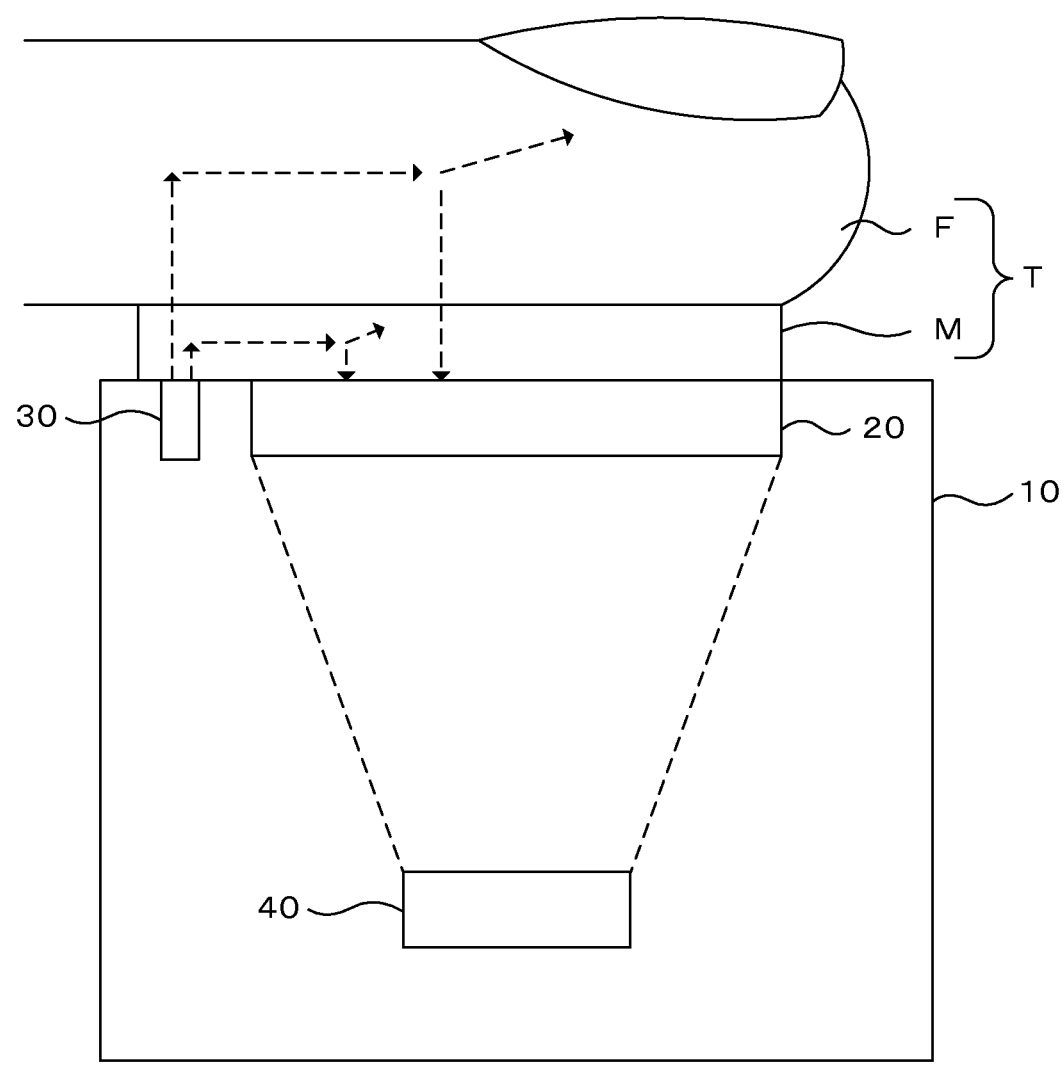
FIG. 15 is a diagram depicting a configuration of a fake finger determination apparatus according to a variant form.

The fake finger determination apparatus according to each embodiment mentioned above has each composing element illustrated in FIG. 1, or each composing element illustrated in FIG. 11, but the fake finger determination apparatus does not always require all of these composing elements. For example, the fake finger determination apparatus 1 can have at least the enclosure 10, the transparent plate 20, the light source 30 and the imaging device 40, as illustrated in FIG. 15. In this case, the determining unit 51 and the combining unit 52 of the controller 50 can be separately connected outside the fake finger determination apparatus 1.

This application declares a priority based on Japanese Patent Application No. 2009-245298 applied on Oct. 26, 2009, and includes the entire disclosure thereof.

Although the present invention has been described with reference to the embodiments, the present invention is not limited to the embodiments. The configuration and details of a present invention can be modified in numerous ways by those skilled in the art without departing from the scope of the invention.

The fake finger determination apparatus and the fake finger determination method according to the present invention are suitable for improving accuracy to discern a fake finger created by attaching a transparent film to the surface of a finger.

1 fake finger determination apparatus
10 enclosure
20 transparent plate
30 light source
40 imaging device
50 controller
51 determining unit
52 combining unit

What is claimed is:

1. A fake finger detection apparatus comprising:
   at least one light source configured to emit light directly to an object that is a film attached to a finger;
   a plurality of transparent plates that form a mounting surface for the object;
   an imaging unit configured to capture images of the object mounted on each of two mounting areas provided at different positions on the plurality of transparent plates; and
   a processor configured to combine the images captured by the imaging unit into a combined image,
   wherein the processor determines that the object is a fake finger if brightness values of a plurality of pixels of the combined image are greater than brightness values of a plurality pixels of an image of a finger with a transparent film attached to a surface of the finger, or determines that the object is a fake finger if the brightness values of the plurality of pixels of the combined image are less than brightness values of a plurality of pixels of an image of the finger with an opaque film attached to the surface of the finger,
   wherein a top surface of each of the at least one light source is interposed between the plurality of transparent plates, and is disposed so as to be located on a same plane as the mounting surface formed by the transparent plates,
   wherein the imaging unit is disposed below the plurality of transparent plates,
   wherein the processor is configured to compare a pattern of a first image of the object placed on one mounting area with a pattern of a second image of the object placed on the other mounting area, and generate the combined image by superposing similar characteristic points within the first image and the second image, and
   wherein the processor is configured to prompt for capture of further images of the object as an input error when a similarity between the patterns is lower than a predetermined threshold.

2. The fake finger detection apparatus according to claim 1, wherein the processor is configured to calculate an attenuation factor indicating a degree of attenuation of light by using the brightness value of at least one predetermined pixel among the plurality of pixels included in the combined image, and
   wherein the processor is configured to determine whether the object is a fake finger or not depending on whether the calculated attenuation factor is within a predetermined range of attenuation factors.

3. The fake finger detection apparatus according to claim 1, wherein the processor is configured to determine whether the object is a fake finger or not, using a range of brightness values of pixels in real-finger images, the pixels being at predetermined positions.

4. The fake finger detection apparatus according to claim 1, wherein the processor is configured to determine whether the object is a fake finger or not, based on whether the brightness value of at least one predetermined pixel among the plurality of pixels included in the combined image is within a predetermined range of brightness values, wherein the predetermined range of brightness values is determined using a positional relationship between the at least one light source and the at least one predetermined pixel.

5. The fake finger detection apparatus according to claim 1, wherein the at least one light source is located at a position where light reflected by a surface of the object is not included in the image captured by the imaging unit.

6. The fake finger detection apparatus according to claim 1, wherein the light source is placed under the finger.

7. A fake finger detection method comprising:
   emitting light from at least one light source through a plurality of transparent plates that form a mounting surface for an object, directly to the object that is a film attached to a finger;
   capturing, using an imaging unit, images of the object mounted on each of two mounting areas provided at different positions on the plurality of transparent plates;
   combining, using a processor, two images captured by the imaging unit into a combined image; and
   determining, using the processor, that the object is a fake finger if brightness values of a plurality of pixels of the combined image are greater than brightness values of a plurality of pixels of an image of a finger with a transparent film attached to a surface of the finger, or determines that the object is a fake finger if the brightness values of the plurality of pixels of the combined image are less than brightness values of a plurality of pixels of an image of the finger with an opaque film attached to the surface of the finger, wherein a top surface of each of the at least one light source is interposed between the plurality of transparent plates, and is disposed so as to be located on a same plane as the mounting surface formed by the transparent plates, wherein the imaging unit is disposed below the plurality of transparent plates, wherein the combining comprises comparing a pattern of a first image of the object placed on one mounting area with a pattern of a second image of the object placed on the other mounting area, and superposing similar characteristic points within the first image and the second image, and wherein the determining further includes prompting for capture of further images of the object as an input error when a similarity between the patterns is lower than a predetermined threshold.

8. The fake finger detection method according to claim 7, wherein the light source is placed under the object.

* * * * *